(12) United States Patent
Chang et al.

(10) Patent No.: US 11,088,439 B2
(45) Date of Patent: Aug. 10, 2021

(54) MOBILE DEVICE AND DETACHABLE ANTENNA STRUCTURE

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/930,442

(22) Filed: Jul. 16, 2020

(65) Prior Publication Data

US 2021/0175611 A1 Jun. 10, 2021

(30) Foreign Application Priority Data

Dec. 10, 2019 (TW) .................................. 108145077

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1626* (2013.01); *H01Q 1/36* (2013.01); *H01Q 1/44* (2013.01)

(58) Field of Classification Search
CPC ............ H01Q 1/24; H01Q 1/243; H01Q 1/36; H01Q 1/44; H01Q 21/30; G06F 1/16; G06F 1/1626
See application file for complete search history.

(56) References Cited

U.S. PATENT DOCUMENTS 5,696,517 A * 12/1997 Kawahata ............ H01Q 1/2283
343/700 MS
2005/0057406 A1* 3/2005 Ohara .................... H01Q 5/378
343/702

(Continued)

FOREIGN PATENT DOCUMENTS

TW I583051 B 5/2017
TW I646726 B 1/2019

OTHER PUBLICATIONS

Chinese language office action dated Jun. 19, 2020, issued in application No. TW 108145077.

*Primary Examiner* — Thai Pham
(74) *Attorney, Agent, or Firm* — McClure, Qualey & Rodack, LLP

(57) ABSTRACT

A mobile device includes a main antenna structure and a detachable antenna structure. The main antenna structure includes a feeding radiation element, a grounding radiation element, a dielectric substrate, and an iron element. The grounding radiation element is adjacent to the feeding radiation element. The feeding radiation element and the grounding radiation element are disposed on the surface of the dielectric substrate. The iron element is coupled to the grounding radiation element. The detachable antenna structure includes a first radiation element, a second radiation element, a third radiation element, and a magnetic element. The third radiation element is coupled between the first radiation element and the second radiation element. The magnetic element is coupled to the third radiation element. When the magnetic element is attracted to the iron element, the detachable antenna structure can enhance the radiation gain of the main antenna structure.

20 Claims, 4 Drawing Sheets

(51) Int. Cl.
*H01Q 1/44* (2006.01)
*H01Q 1/36* (2006.01)

(56) References Cited

U.S. PATENT DOCUMENTS

| | | | |
|---|---|---|---|
| 2006/0109179 A1* | 5/2006 | Humpfer | H01Q 5/378 343/700 MS |
| 2017/0117623 A1* | 4/2017 | Chan | H01Q 1/44 |
| 2018/0309203 A1* | 10/2018 | Yu | H01Q 1/241 |

* cited by examiner

MOBILE DEVICE AND DETACHABLE ANTENNA STRUCTURE

CROSS REFERENCE TO RELATED APPLICATIONS

This application claims priority of Taiwan Patent Application No. 108145077 filed on Dec. 10, 2019, the entirety of which is incorporated by reference herein.

BACKGROUND OF THE INVENTION

Field of the Invention

The disclosure generally relates to a mobile device, and more particularly, it relates to a mobile device and a detachable antenna structure.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements for wireless communication. If an antenna used for signal reception and transmission has insufficient gain, the communication quality of the mobile device will suffer. Accordingly, it has become a critical challenge for antenna designers to design a small-size, high-gain antenna element.

BRIEF SUMMARY OF THE INVENTION

In an exemplary embodiment, the disclosure is directed to a mobile device that includes a main antenna structure and a detachable antenna structure. The main antenna structure includes a feeding radiation element, a grounding radiation element, a dielectric substrate, and an iron element. The feeding radiation element is coupled to a signal source. The grounding radiation element is coupled to a ground voltage. The grounding radiation element is adjacent to the feeding radiation element. The feeding radiation element and the grounding radiation element are disposed on the surface of the dielectric substrate. The iron element is coupled to the grounding radiation element. The detachable antenna structure includes a first radiation element, a second radiation element, a third radiation element, and a magnetic element. The second radiation element is substantially parallel to the first radiation element. The third radiation element is coupled between the first radiation element and the second radiation element. The magnetic element is coupled to the third radiation element. When the magnetic element is attracted to the iron element, the detachable antenna structure enhances the radiation gain of the main antenna structure.

In some embodiments, the iron element is positioned on a plane which is substantially perpendicular to the surface of the dielectric substrate.

In some embodiments, the feeding radiation element substantially has an N-shape.

In some embodiments, the grounding radiation element substantially has an L-shape.

In some embodiments, the main antenna structure covers a first frequency band from 2400 MHz to 2500 MHz, and a second frequency band from 5150 MHz to 5850 MHz.

In some embodiments, the length of the feeding radiation element is substantially equal to 0.25 wavelength of the second frequency band.

In some embodiments, the length of the grounding radiation element is substantially equal to 0.25 wavelength of the first frequency band.

In some embodiments, the total length of the magnetic element and the first radiation element is substantially equal to 0.25 wavelength of the first frequency band.

In some embodiments, the total length of the magnetic element and the second radiation element is substantially equal to 0.25 wavelength of the second frequency band.

In another exemplary embodiment, the disclosure is directed to a detachable antenna structure that includes a first radiation element, a second radiation element, a third radiation element, and a magnetic element. The second radiation element is substantially parallel to the first radiation element. The third radiation element is coupled between the first radiation element and the second radiation element. The magnetic element is coupled to the third radiation element. When the magnetic element is attracted to an iron element of the main antenna structure, the detachable antenna structure enhances the radiation gain of the main antenna structure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
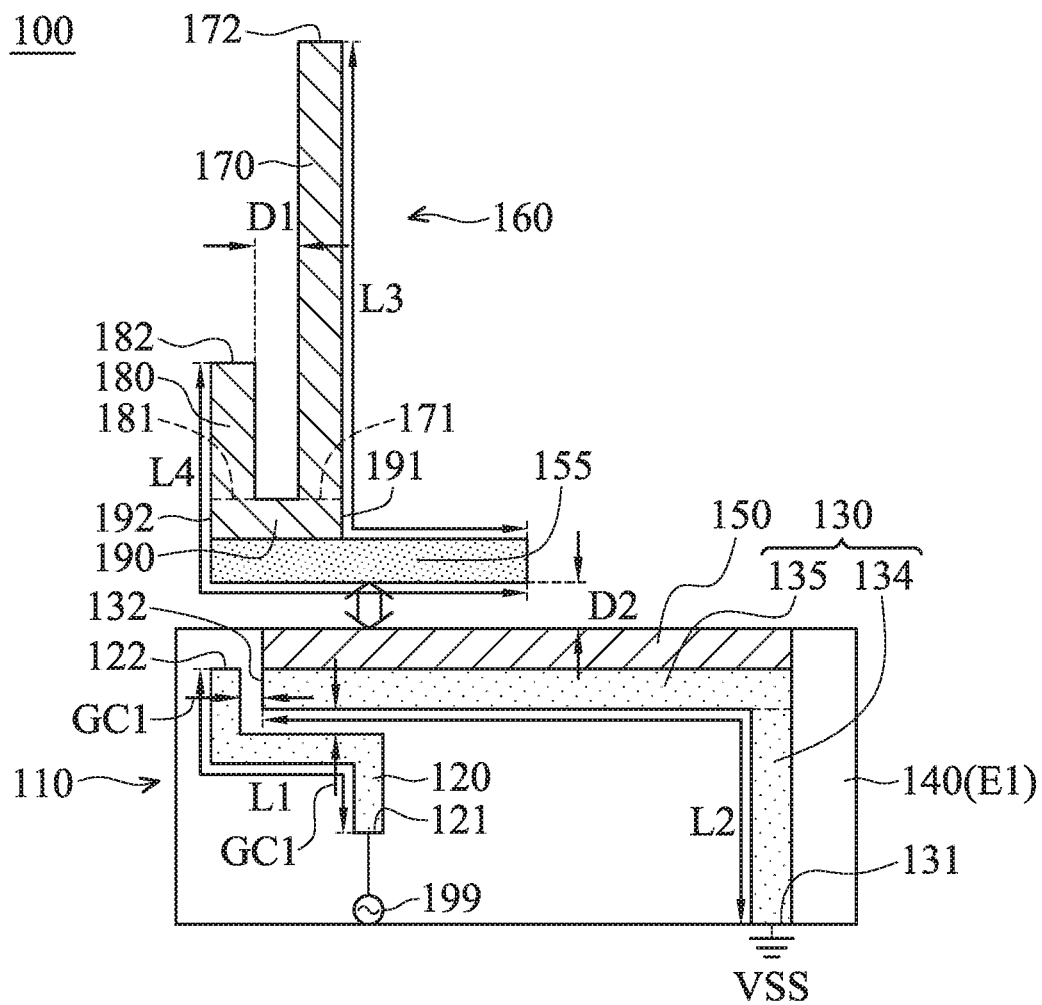
FIG. 1 is a top view of a mobile device according to an embodiment of the invention.
Figure 2:
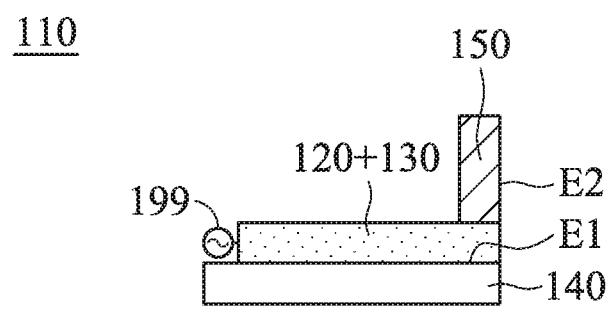
FIG. 2 is a side view of the main antenna structure of a mobile device according to an embodiment of the invention.

FIG. 1 is a top view of a mobile device 100 according to an embodiment of the invention. For example, the mobile device 100 may be a smartphone, a tablet computer, or a notebook computer. The mobile device 100 at least includes a main antenna structure 110 and a detachable antenna structure 160. FIG. 2 is a side view of the main antenna structure 110 of the mobile device 100 according to an embodiment of the invention. Please refer to FIG. 1 and FIG. 2 together. It should be understood that the mobile device 100 may further include other components, such as a display device, a speaker, a touch control module, a power supply module, and/or a housing, although they are not displayed in FIG. 1 and FIG. 2.

In the embodiment of FIG. 1 and FIG. 2, the main antenna structure 110 includes a feeding radiation element 120, a grounding radiation element 130, a dielectric substrate 140, and an iron element 150. The feeding radiation element 120 and the grounding radiation element 130 may be made of metal materials, such as copper, silver, aluminum, iron, or their alloys. The dielectric substrate 140 may be an FR4 (Flame Retardant 4) substrate, a PCB (Printed Circuit Board), or FCB (Flexible Circuit Board). The feeding radiation element 120 and the grounding radiation element 130 may be disposed on the same surface E1 of the dielectric substrate 140.

The feeding radiation element 120 may substantially have an N-shape or a Z-shape. Specifically, the feeding radiation element 120 has a first end 121 and a second end 122. The first end 121 of the feeding radiation element 120 is coupled to a signal source 199. The second end 122 of the feeding radiation element 120 is an open end. For example, the signal source 199 may be an RF (Radio Frequency) module for exciting the main antenna structure 110.

The grounding radiation element 130 may substantially have an L-shape, which is completely separate from the feeding radiation element 120. Specifically, the grounding radiation element 130 has a first end 131 and a second end 132. The first end 131 of the grounding radiation element 130 is coupled to a ground voltage VSS. The second end 132 of the grounding radiation element 130 is an open end, which is adjacent to the feeding radiation element 120. Thus, a coupling gap GC1 is formed between the grounding radiation element 130 and the feeding radiation element 120. It should be noted that the term "adjacent" or "close" over the disclosure means that the distance (spacing) between two corresponding elements is smaller than a predetermined distance (e.g., 5 mm or shorter), but often does not mean that the two corresponding elements directly touch each other (i.e., the aforementioned distance/spacing therebetween is reduced to 0). In some embodiments, the grounding radiation element 130 includes a first portion 134 and a second portion 135. The first portion 134 is adjacent to the first end 131. The second portion 135 is adjacent to the second end 132. In the grounding radiation element 130, the second portion 135 is substantially perpendicular to the first portion 134, and the length of the second portion 135 is longer than the length of first portion 134.

The iron element 150 may substantially have a straight-line shape. The iron element 150 is coupled to the second portion 135 of the grounding radiation element 130. The length of the iron element 150 may be substantially equal to the length of the second portion 135 of the grounding radiation element 130. In some embodiments, the iron element 150 is positioned on a plane E2, and this plane E2 is substantially perpendicular to the surface E1 of the dielectric substrate 140. However, the invention is not limited thereto. In alternative embodiments, the iron element 150 is positioned on another plane which is substantially parallel to the surface E1 of the dielectric substrate 140.

In the embodiment of FIG. 1 and FIG. 2, the detachable antenna structure 160 includes a first radiation element 170, a second radiation element 180, a third radiation element 190, and a magnetic element 155. The first radiation element 170, the second radiation element 180, and the third radiation element 190 may all be made of metal materials.

The first radiation element 170 may substantially have a straight-line shape. Specifically, the first radiation element 170 has a first end 171 and a second end 172. The second end 172 of the first radiation element 170 is an open end.

The second radiation element 180 may substantially have a straight-line shape, which may be substantially parallel to the first radiation element 170. Specifically, the second radiation element 180 has a first end 181 and a second end 182. The second end 182 of the second radiation element 180 is an open end. The second end 182 of the second radiation element 180 and the second end 172 of the first radiation element 170 may substantially extend in the same direction. The length of the second radiation element 180 is shorter than the length of the first radiation element 170.

The third radiation element 190 may substantially have a straight-line shape, which may be substantially perpendicular to both of the first radiation element 170 and the second radiation element 180. Specifically, the third radiation element 190 has a first end 191 and a second end 192. The first end 191 of the third radiation element 190 is coupled to the first end 171 of the first radiation element 170. The second end 192 of the third radiation element 190 is coupled to the first end 181 of the second radiation element 180. That is, the third radiation element 190 is coupled between the first radiation element 170 and the second radiation element 180. The length of the third radiation element 190 is shorter than or equal to the length of the second radiation element 180. In some embodiments, a combination of the first radiation element 170, the second radiation element 180, and the third radiation element 190 substantially has a J-shape.

The magnetic element 155 may substantially has a straight-line shape. The magnetic element 155 is coupled to the third radiation element 190. When the magnetic element 155 is attracted to the iron element 150, a coupling effect is induced between the main antenna structure 110 and the detachable antenna element 160, such that the detachable antenna structure 160 enhances the radiation gain of the main antenna structure 110. In the embodiment of FIG. 1 and FIG. 2, the detachable antenna structure 160 is an additional element of the mobile device 100, but the invention is not limited thereto. In alternative embodiments, the detachable antenna structure 160 is used independently, and it is not limited to being used in the mobile device 100.

Figure 3:
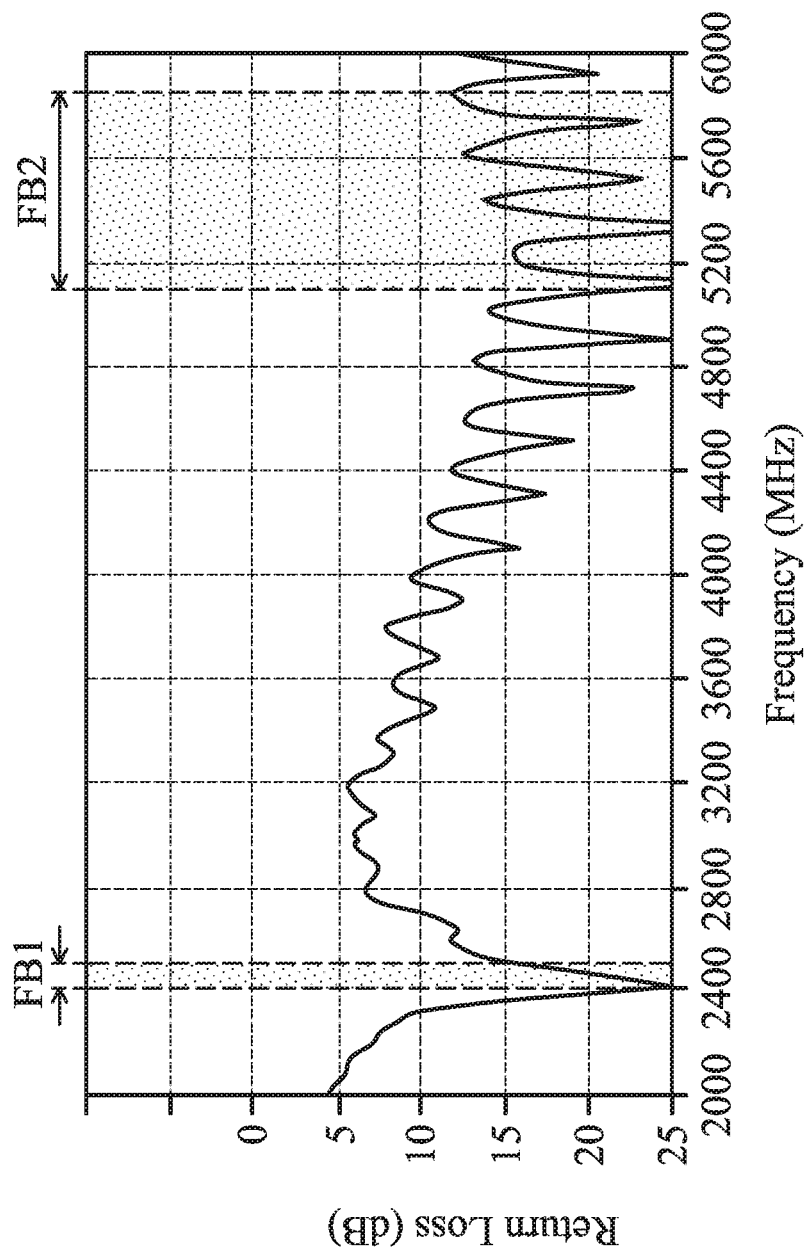
FIG. 3 is a diagram of return loss of the main antenna structure of a mobile device according to an embodiment of the invention.

FIG. 3 is a diagram of return loss of the main antenna structure 110 of the mobile device 100 according to an embodiment of the invention. The horizontal axis represents operation frequency (MHz), and the vertical axis represents the return loss (dB). According to the measurement of FIG. 3, the main antenna structure 110 combined with the detachable antenna structure 160 can cover a first frequency band FB1 and a second frequency band FB2. For example, the first frequency band FB1 may be from 2400 MHz to 2500 MHz, and the second frequency band FB2 may be from 5150 MHz to 5850 MHz. Thus, the main antenna structure 110 can support at least the dual-band operations of WLAN (Wireless Local Area Networks) 2.4 GHz/5 GHz.

In some embodiments, the operation principles of the mobile device 100 are described as follows. When the main antenna structure 110 and the detachable antenna structure 160 have not been attracted to each other (i.e., the detachable antenna structure 160 is not in use), the feeding radiation element 120 can be excited to generate the aforementioned second frequency band FB2, and the feeding radiation element 120 and the grounding radiation element 130 can be excited together to generate the aforementioned first frequency band FB1. When the main antenna structure 110 and the detachable antenna structure 160 have been attracted to each other (i.e., the detachable antenna structure 160 is in use), the magnetic element 155 and the first radiation element 170 can be excited by the feeding radiation element 120 and the grounding radiation element 130 using a coupling mechanism, so as to enhance the radiation gain of the first frequency band FB1; furthermore, the magnetic element 155 and the second radiation element 180 can be excited by the feeding radiation element 120 and the grounding radiation element 130 using a coupling mechanism, so as to enhance the radiation gain of the second frequency band FB2.

Figure 4:
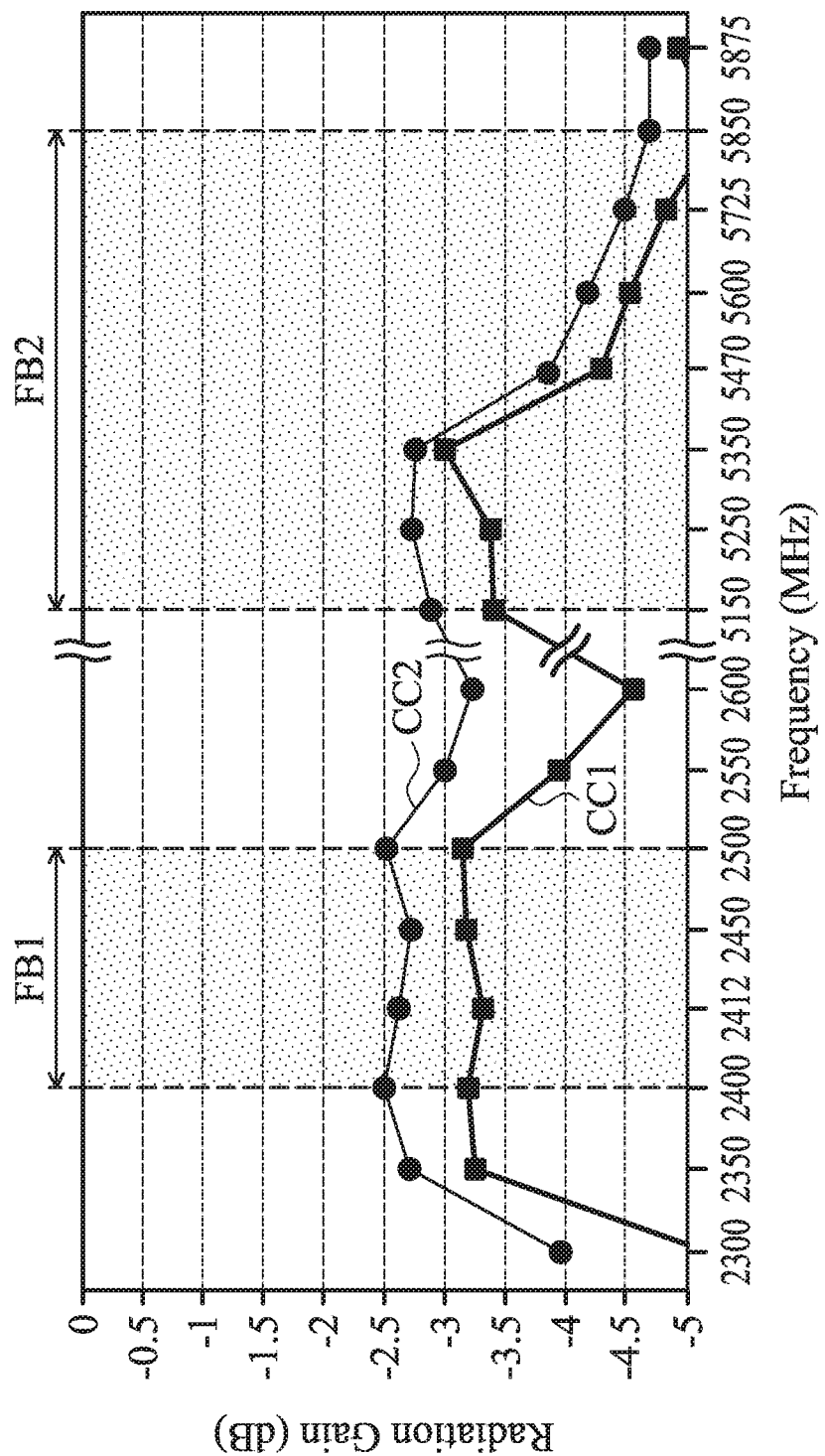
FIG. 4 is a diagram of radiation gain of the main antenna structure of a mobile device according to an embodiment of the invention.

FIG. 4 is a diagram of radiation gain of the main antenna structure 110 of the mobile device 100 according to an embodiment of the invention. The horizontal axis represents operation frequency (MHz), and the vertical axis represents the radiation gain (dB). As shown in FIG. 4, a first curve CC1 represents the operation characteristic of the main antenna structure 110 when the detachable antenna structure 160 is not used, and a second curve CC2 represents the operation characteristic of the main antenna structure 110 when the detachable antenna structure 160 is used. According to the measurement of FIG. 4, the incorporation of the detachable antenna structure 160 can increase the radiation gain of first frequency band FB1 by about 1.5 dB, and also increase the radiation gain of second frequency band FB2 by about 1 dB. This meets the requirements of practical application of general mobile communication devices.

In some embodiments, the element sizes of the mobile device 100 are described as follows. The length L1 of the feeding radiation element 120 may be substantially equal to 0.25 wavelength ($\lambda$/4) of the second frequency band FB2 of the main antenna structure 110. The length L2 of the grounding radiation element 130 may be substantially equal to 0.25 wavelength ($\lambda$/4) of the first frequency band FB1 of the main antenna structure 110. The width of the coupling gap GC1 between the feeding radiation element 120 and the grounding radiation element 130 may be from 0.5 mm to 1.5 mm. The total length L3 of the magnetic element 155 and the first radiation element 170 may be substantially equal to 0.25 wavelength ($\lambda$/4) of the first frequency band FB1. The total length L4 of the magnetic element 155 and the second radiation element 180 may be substantially equal to 0.25 wavelength ($\lambda$/4) of the second frequency band FB2. The distance D1 between the first radiation element 170 and the second radiation element 180 may be from 2 mm to 3 mm. When the main antenna structure 110 and the detachable antenna structure 160 have been attracted to each other, the distance D2 between the magnetic element 155 and the iron element 150 should be shorter than or equal to 3 mm. The above ranges of element sizes are calculated and obtained according to many experiment results, and they help to optimize the radiation gain, operation bandwidth and impedance matching of the main antenna structure 110.

Figure 5:
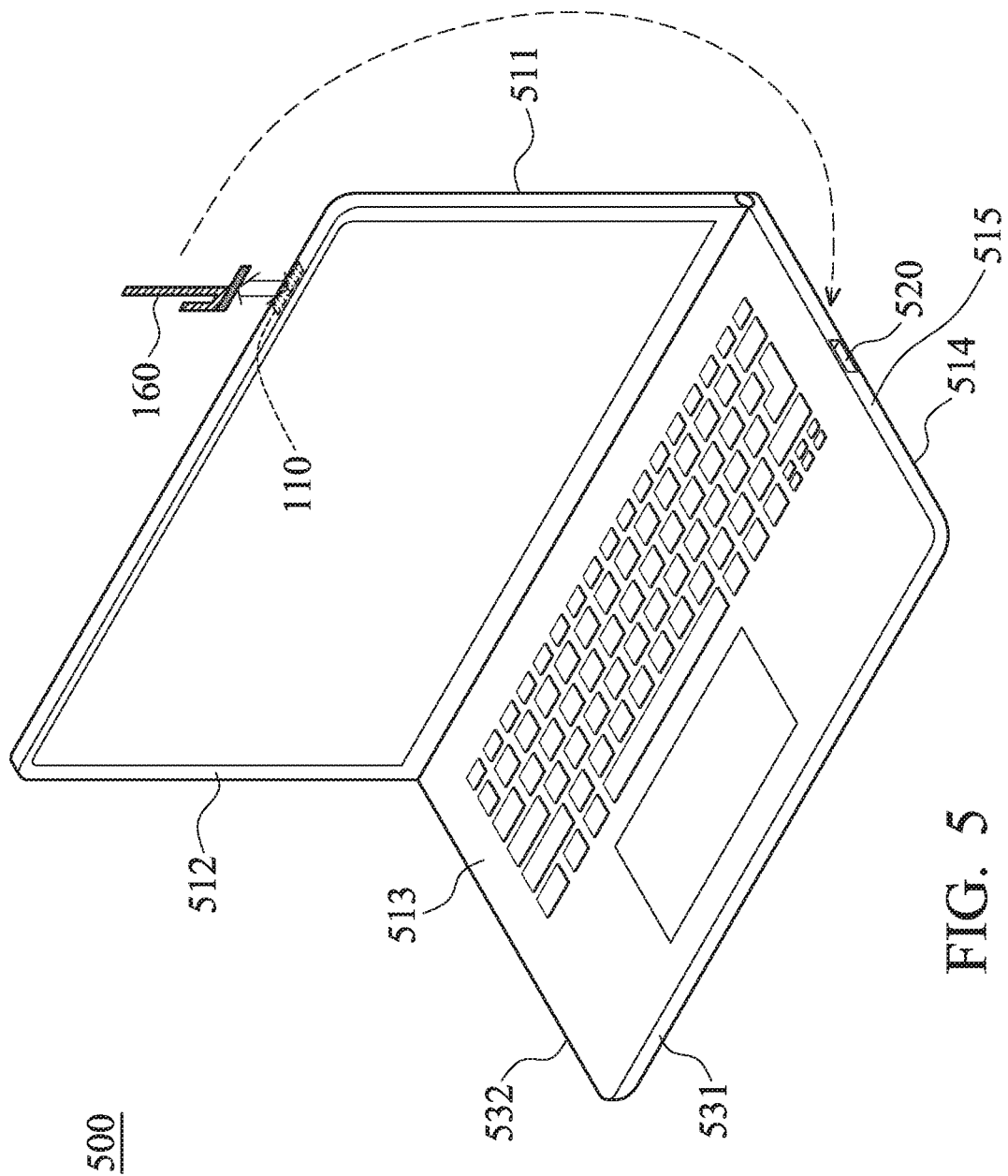
FIG. 5 is a diagram of a notebook computer according to an embodiment of the invention.

FIG. 5 is a diagram of a notebook computer 500 according to an embodiment of the invention. In the embodiment of FIG. 5, the main antenna structure 110 and the detachable antenna structure 160 may be both applied to the notebook computer 500. The notebook computer 500 includes an upper cover housing 511, a display frame 512, a keyboard frame 513, and a base housing 514. It should be understood that the upper cover housing 511, the display frame 512, the keyboard frame 513, and the base housing 514 are equivalent to the "A-component", "B-component", "C-component", and "D-component", respectively, in the field of notebook computers. A sidewall 515 between the keyboard frame 513 and the base housing 514 may have a concave region 520. When the detachable antenna structure 160 is not used, it can be accommodated in the concave region 520, so as to keep the beautiful appearance of the whole device. However, the invention is not limited thereto. In alternative embodiments, the concave region 520 may be at other positions of the sidewall 515, such as a front position 531 or a side position 532, without affecting the performance of the invention.

The invention proposes a novel mobile device which includes a main antenna structure and a detachable antenna structure. When the detachable antenna structure is combined with the main antenna structure, the antenna radiation gain of the mobile device can be significantly increased. Generally, the invention has at least the advantages of high gain, small size, wide bandwidth, and a beautiful appearance, and therefore it is suitable for application in a variety of mobile communication devices.

Note that the above element sizes, element shapes, element parameters, and frequency ranges are not limitations of the invention. An antenna designer can fine-tune these settings or values according to different requirements. It should be understood that the mobile device and detachable antenna structure of the invention are not limited to the configurations of FIGS. 1-5. The invention may merely include any one or more features of any one or more embodiments of FIGS. 1-5. In other words, not all of the features displayed in the figures should be implemented in the mobile device and detachable antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:
   a main antenna structure, comprising:
   a feeding radiation element, coupled to a signal source;
   a grounding radiation element, coupled to a ground voltage, wherein the grounding radiation element is adjacent to the feeding radiation element;
   a dielectric substrate, wherein the feeding radiation element and the grounding radiation element are disposed on a surface of the dielectric substrate; and
   an iron element, coupled to the grounding radiation element; and
   a detachable antenna structure, comprising:
   a first radiation element;
   a second radiation element, wherein the second radiation element is substantially parallel to the first radiation element;
   a third radiation element, coupled between the first radiation element and the second radiation element; and
   a magnetic element, coupled to the third radiation element;
   wherein when the magnetic element is attracted to the iron element, the detachable antenna structure enhances radiation gain of the main antenna structure.

2. The mobile device as claimed in claim 1, wherein the iron element is positioned on a plane which is substantially perpendicular to the surface of the dielectric substrate.

3. The mobile device as claimed in claim 1, wherein the feeding radiation element substantially has an N-shape.

4. The mobile device as claimed in claim 1, wherein the grounding radiation element substantially has an L-shape.

5. The mobile device as claimed in claim 1, wherein the main antenna structure covers a first frequency band and a second frequency band.

6. The mobile device as claimed in claim 5, wherein the first frequency band is from 2400 MHz to 2500 MHz.

7. The mobile device as claimed in claim 5, wherein the second frequency band is from 5150 MHz to 5850 MHz.

8. The mobile device as claimed in claim 5, wherein a length of the feeding radiation element is substantially equal to 0.25 wavelength of the second frequency band.

9. The mobile device as claimed in claim 5, wherein a length of the grounding radiation element is substantially equal to 0.25 wavelength of the first frequency band.

10. The mobile device as claimed in claim 5, wherein a total length of the magnetic element and the first radiation element is substantially equal to 0.25 wavelength of the first frequency band.

11. The mobile device as claimed in claim 5, wherein a total length of the magnetic element and the second radiation element is substantially equal to 0.25 wavelength of the second frequency band.

12. The mobile device as claimed in claim 1, wherein a coupling gap is formed between the feeding radiation element and the grounding radiation element, and a width of the coupling gap is from 0.5 mm to 1.5 mm.

13. The mobile device as claimed in claim 1, wherein a distance between the first radiation element and the second radiation element is from 2 mm to 3 mm.

14. A detachable antenna structure, comprising:
    a first radiation element;
    a second radiation element, wherein the second radiation element is substantially parallel to the first radiation element;
    a third radiation element, coupled between the first radiation element and the second radiation element; and
    a magnetic element, coupled to the third radiation element;
    wherein when the magnetic element is attracted to an iron element of a main antenna structure, the detachable antenna structure enhances radiation gain of the main antenna structure.

15. The detachable antenna structure as claimed in claim 14, wherein the main antenna structure covers a first frequency band from and a second frequency band.

16. The detachable antenna structure as claimed in claim 15, wherein the first frequency band is from 2400 MHz to 2500 MHz.

17. The detachable antenna structure as claimed in claim 15, wherein the second frequency band is from 5150 MHz to 5850 MHz.

18. The detachable antenna structure as claimed in claim 15, wherein a total length of the magnetic element and the first radiation element is substantially equal to 0.25 wavelength of the first frequency band.

19. The detachable antenna structure as claimed in claim 15, wherein a total length of the magnetic element and the second radiation element is substantially equal to 0.25 wavelength of the second frequency band.

20. The detachable antenna structure as claimed in claim 14, wherein a distance between the first radiation element and the second radiation element is from 2 mm to 3 mm.

* * * * *